United States Patent [19]

Asano et al.

[11] Patent Number: 4,826,421
[45] Date of Patent: May 2, 1989

[54] CENTERING DEVICE FOR PLASTIC WEB

[75] Inventors: Kazuo Asano; Toshihiro Takai; Masayasu Kinoshita, all of Nagoya, Japan

[73] Assignee: Kabushiki Kaisha Asano Kenkyusho, Aichi, Japan

[21] Appl. No.: 244,382

[22] Filed: Sep. 15, 1988

[30] Foreign Application Priority Data

Dec. 26, 1987 [JP] Japan ................................ 62-197973

[51] Int. Cl.⁴ .......................... B30B 15/30; B65H 9/10
[52] U.S. Cl. .................... 425/403.1; 72/361;
100/215; 198/345; 269/73; 271/223; 271/253; 425/472
[58] Field of Search ............... 271/171, 223, 253, 240, 271/241, 238, 249; 72/361, 420, 426; 100/215; 400/616, 616.1; 425/138, 403.1, 472; 198/345; 269/73

[56] References Cited

U.S. PATENT DOCUMENTS 4,579,321 4/1986 Kawano .............................. 269/73
4,775,141 10/1988 Trenzen ............................. 271/223

*Primary Examiner*—Willard Hoag
*Attorney, Agent, or Firm*—Sughrue, Mion, Zinn, Macpeak & Seas

[57] ABSTRACT

A device for centering plastic webs automatically fed thereon one by one so as to feed it to a pair of cramp chains to be correctly gripped thereby at the opposite side edges. This comprises a bed consisting of a central frame and longitidinal as well as transverse arms respectively extended in opposite directions from the central frame for supporting the web of varied size. A plurality of pairs of centering members, each having an upwardly projected pin, are oppositely arranged and adapted to move toward and apart with each other so as to abut on the longitudinal and transverse side edges of web on the table with said pin for centering. It is preferable and sufficient to move said centering members by means of a belt and pulleys for treating a light web.

4 Claims, 7 Drawing Sheets

CENTERING DEVICE FOR PLASTIC WEB

BACKGROUND OF THE INVENTION

The invention relates to a device for centering a plastic web, and more particularly to the centering device for the plastic web so as to be correctly gripped at the opposite side edges thereof by a pair of cramp chains to be brought into the forming machine.

Various articles such as plates, dishes, bowls, buckets, refrigerator linings, bath tubs and the like are formed by feeding plasticized polymer sheet between separated male and female dies and engaging said dies together in the forming machine. The plastic sheet may be formed continuously by the extruder through a slit nozzle of sizes corresponding to the width and thickness of the sheet to be formed. Since the forming operation according to alternate engaging and disengaging of the opposite dies is of intermittent nature, the continuously formed plastic sheet can not be directly fed to the forming machine without providing any particular means for compensating slackening of the continued sheet to be inevitably caused during every forming operation.

In general, the extruded plastic sheet is thus successively cut in a desired length of webs for forming the desired article, which are taken on a pallet to be delivered directly from the extruder or from a warehouse once stored to the forming machine.

The stack of plastic webs, however, is inevitably collapsed to be uneven more or less on the pallet during the delivery. When the stacked webs are automatically taken up as they are one by one by a robot sucking disk carrier, it is often impossible for the pair of cramp chains of the forming machine to correctly grip the webs successively fed from the robot.

Since the industrial robots work just according to the locus previously taught, the article to be processed thereby must be always placed in the correct position. The usual centering devices for substantially flat articles comprise a pair of stoppers to abut on the two adjacent side edges thereof and pair of movable centering members to urges the article at the opposite two side edges toward said stoppers. The movable members are stopped in reply to reaction of abutment on the concerned side edges of the article or detection of the moved stroke of the centering members determined fixedly in advance.

The centering devices of the latter type are not suitable for treatment of the article of which sizes are varied, since many detectors such as limit switches, encoders and the like must be provided so as to cope with such varied sizes. The devices of the former type are not satisfactory since the manufacturing errors in the size is doubled at the two sides of the article on which the movable members abut.

Japanese Utility Model Application laid for early opening (KOKAI) on Dec. 5, 1985 under the number of Sho 60(1985)-183,131 has disclosed the centering device of said former type for substantially flat articles, above all automobile front and rear curved window glasses to be applied with adhesives along the four side edges thereof by the robot applier, which comprises a plurality of vertical bars for supporting said curved glass on the tops thereof, a plurality of pairs of opposite centering members movable longitudinally and transversely, and corresponding numbers of driving means each comprising a central rotor cylinder, a central link lever fixed thereon to be angularly moved, a pair of link arms each pivotally connected with the free end of the central link lever at one end and with said centering member at the other end so that when said rotor cylinder is angularly moved the opposite members are moved toward and apart with each other.

This proposal, however, cannot be used for the plastic web to be correctly gripped by the cramp chains since the centered web must be brought to the cramps of the chains. Futhermore, the proposed device is not desirable due to the rather too complex and strong construction for treating fairly light plastic web, and due to that it can not cope with wider size variation since the length of the central link lever is mechanistically limited.

SUMMARY OF THE INVENTION

An object of the invention is, thus, to provide a centering device for a plastic web so as to be gripped by a pair of cramp chains in the forming machine, which is of simple construction and consequently of a lower cost.

Said object can be attained according to the invention by a device for centering a plastic web of which length and width are varied depending on the size of an article to be formed, comprising a machine frame, a bed fixed thereto and consisting of a central frame and at least two longitudinal as well as at least two transverse arms respectively extending in opposite directions from said central frame so as to support the webs of various sizes thereon, at least two longitudinal as well as at least two transverse guide rails respectively extending in opposite directions from and beneath said central frame, at least two pairs of centering members oppositely arranged, each having a pin vertically planted thereon so as to abut the web respectively on the concerned side edge and slidingly move along the respective longitudinal and transverse guide rails, first and second means for driving said pairs of opposite centering members to slindingly move toward and apart each other at the same rate.

DESCRIPTION OF THE PREFERRED EMBODIMENT

Figure 1:
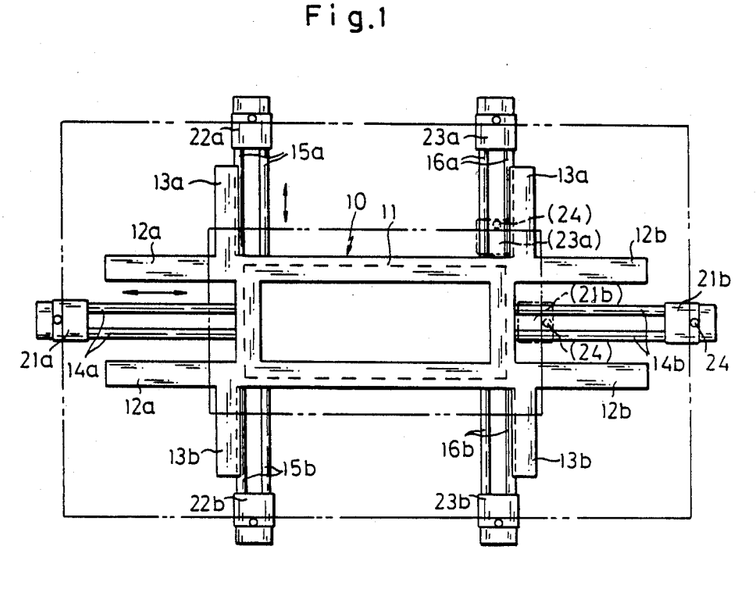
FIG. 1 is a top plan view of the device according to the invention for showing a bed frame for supporting a plastic web thereon to be centenred, longitudinally and transversely extended guide rails and pairs of oppositely arranged members slidingly movable toward and apart with each other along said rails for centering.

In FIG. 1, the device according to a preferred embodiment of the invention comprises a bed represented generally by 10 for supporting thereon the plastic web of varied sizes, which consists of a central frame portion 11, two pairs of arm portions 12a, 12b longitudinally extended therefrom in opposite directions and two pairs of arm portions 13a, 13b transversely extended also from said central frame 11 in opposite directions.

There are provided two pairs of guide rails 14a, 14b longitudinally extended in opposite directions and four pairs of guide rails 15a, 15b; 16a, 16b transversely extended in opposite directions. Said guide rails 14, 15 and 16 are so arranged that the common upper surface thereof is just below the common lower surface of said central frame 11 and said arms 12, 13 by a reason to be readily understood by reading concerned explanations to be given hereafter.

Said rails 14a and 14b have respectively members 21a and 21b slidingly movable therealong toward and apart with each other. Similarly said rails 15a, 15b; 16a, 16b have respectively slindingly movable members 22a, 22b; 23a, 23b. Every slidingly movable member has a pin 24 vertically planted thereon so as to abut on the concerned edge of the plastic web laid on said bed 10.

Outer two-dot chain lines on which the pins 24 of all slidingly movable members 21, 22 and 23 contact theorectically represent the largest size of the plastic web to be centered according to the invention, which is to be practically a little smaller. Inner two-dot lines on which the pins 24 of the slidingly movable members (21b), (23a) shown in phantom lines contact represent the smallest size of the plastic web to be centered according to the invention. In other words, the slidingly movable members 21, 22 and 23 shown in solid lines are in the respective outermost positions, while the members (21b) and (23a) shown in phantom lines indicate the innermost positions thereof and of the other members.

Figure 2:
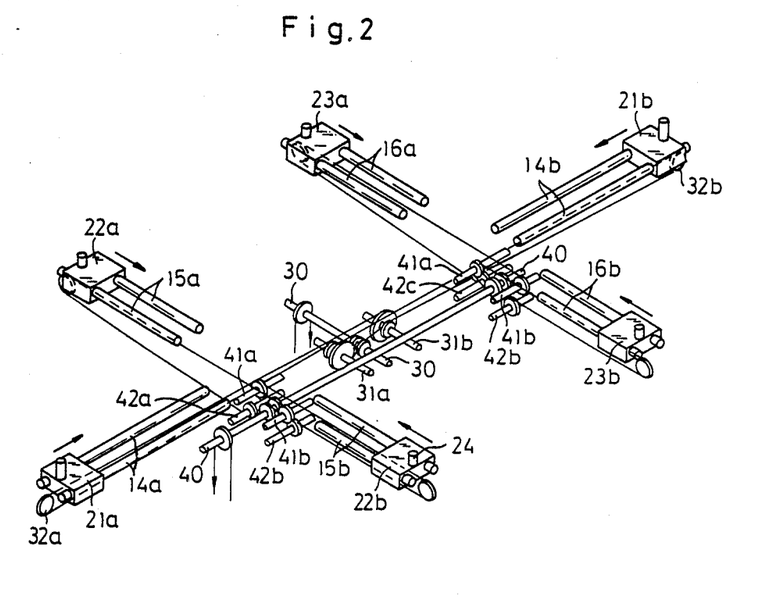
FIG. 2 is a perspective view of said guide rails, said slidingly movable members and means for driving the movable members.

Now in reference to FIG. 2, there are provided a shaft 30 drivingly connected with a reversible electric motor not shown and a pair of shafts 31a, 31b arranged in parallel thereto and with each other. The shafts 31a and 31b are drivingly connected with said shaft 30, and respectively with the movable member 21a and 21b e.g. through a chain-sprocket wheel or pulley-belt mechanism so that when the shaft 30 is driven in either direction e.g. in clockwise direction as shown by an arrow in FIG. 2 the members 21a and 21b which are fixed to the belt or chain respectively at the spot slidingly moved toward with each other as respectively shown also by arrows.

Figure 3:
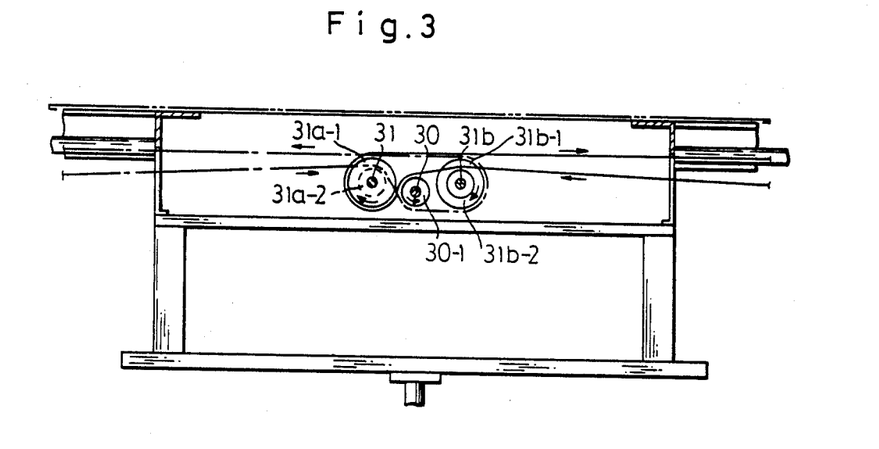
FIG. 3 is a side elevation in a larger scale, partly in section and partly cut off of the device.

In FIG. 3, said shaft 30 is fixedly mounted with a pulley (or sprocket wheel) 30-1, said shaft 31a is mounted fixedly with a pulley (ditto) 31a-1 and idly with a pulley (ditto) 31a-2, and said shaft 31b is mounted with a fixed pulley 31b-1 and an idle pulley 31b-2.

A belt (or chain) shown in a solid line is endlessly extended over the drivingly pulley 30-1, the pulley 31a-1, a pulley 32b mounted for rotation on the movable member 21b (see FIG. 2), the idle pulley 31b-2 and again said driving pulley 30-1 so that when the shaft 30 and consequently the pulley 30-1 is rotated this time in the counterclockwise direction as shown by an arrow in FIG. 3, the belt (or chain) shown in a solid line is driven as shown by arrows so as to pull the member 21b which is fixed to the belt at the spot to be slidingly moved towards the innermost position.

Similarly to the above, another belt shown in one-dot chain line is endlessly extended over the driving pulley 30-1, the pulley 31b-1, a pulley 32a mounted for rotation on the movable member 21a (see FIG. 2), the idle pulley 31a-2 and again said driving pulley 30-1 so that when the shaft 30 and consequently the pulley 30-1 is rotated in the counterclockwise direction as shown by the arrow, said belt is driven as shown by arrows so as to pull the member 21a fixed thereto to be slidingly moved towards the innermost position at the same rate as of the opposite member 21b.

Returning to FIG. 2, there are provided a shaft 40 longitudinally extended and drivingly connected with another reversible electric motor not shown as well as a pair of driven shafts 41a, 41b and a pair of idle shafts 42a, 42b correspondingly extended and arranged on parallel to said driving shaft 40 and to one another. The shafts 41a and 42a are drivingly connected with the movable members 22a, 22b; 23a, 23b e.g. through a pulley-belt or a chain-sprocket wheel mechanism so that when the shaft is driven in either direction, the members 22a, 22b; 23a, 23b each attached to the belt or chain respectively at the spot may be slidingly moved along the respective guide rails in the corresponding direction.

Figure 4:
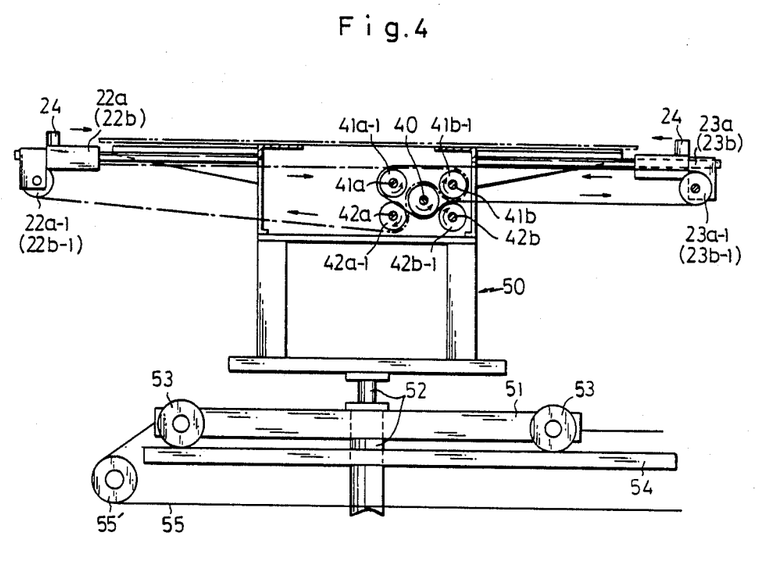
FIG. 4 is an end elevation also in a larger scale, partly in section and partly cut off of the device.

As best shown in FIG. 4, said driving shaft 40, driven shafts 41a, 42a and idle shafts 41b, 42b are respectively mounted with a fixed pulley 40-1, 41a-1, 42a-1, 41b-1 and 42b-1. The slidingly movable members 22a, 22b; 23a, 23b have a respective pulley 22a-1, 22b-1; 23a-1, 23b-1 for free rotation.

A belt as shown in a solid line is endlessly extended over the driving pulley 40-1, between the driven pulley 41b-1 and the idle pulley 42b-1, over the idle pulley 23a-1 (23a-1) of the movable member which is fixed to the belt at the spot, on the pulley 41b-1, over the driven pulley 41a-1 and again to the driving pulley 40-1 so that when the driving pulley 40-1 is rotated in the counterclockwise direction shown by an arrow in FIGS. 2 and 4, the belt runs as shown by arrows given in FIG. 4 and thus the member 23a(23b) fixed thereto is slidingly moved toward the innermost position. Another belt as shown in one-dot chain line is similarly endlessly extended over the driving pulley 40-1, over the driven pulley 41b-1, on the driven pulley 41a-1, over the idle pulley 22a-1 (23a-1) of the movable member which is fixed to the belt at the spot, over the idle pulley 42a-1 and again to the driving pulley 40-1 so that when the driving shaft 40 and consequently the pulley 40-1 is rotated in the counterclockwise direction shown by the arrow in FIGS. 2 and 4, the belt runs shown by arrows given in FIG. 4 and thus the member 22a (22b) fixed thereto is slidingly moved toward the innermost position thereof and consequently toward the opposite member 23a (23b) at the same rate.

A machine frame 50 supporting the table 10, the guide rails 14, 15 and 16 as well as the movable members 21, 22 and 23 respectively mounted for sliding therealong and the means for moving said members including the shafts and pulleys as well as the belts thereon is supported on a carriage 51 via hydraulic piston-cylinder 52. The carriage 51 has a plurality of wheels 53 so as to move along a pair of rails 54 laid on the floor by means of a reversible motor not shown through e.g. a belt 55 a plurality of pulleys 55' to be explained hereafter.

Figure 5:
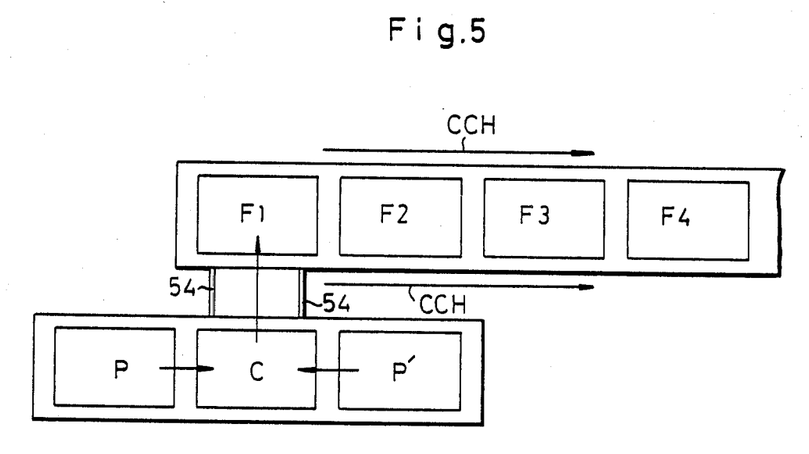
FIG. 5 is a block diagram of the device of the invention and concerned devices.

Now in FIG. 5, a forming apparatus F comprises a web receiving zone F-1, a preheating zone F2, a heating zone F3 and a forming machine F4 as a concerned device relative to the centering device represented here as C according to the invention. Through said apparatus F, a pair of cramp chains CCh are endlessly extended and driven to intermittently run for carrying the received plastic webs one by one to be thermally softened and subjecting to die-formation. At the side of said zone F1, there is normally positioned the centering device C so as to move along the rains 54 to be in the vicinity thereof and feed the plastic web correctly centered thereto as shown by an arrow. In front and rear of the centering device C two pallets P, P' are positioned so as to each apply the plastic webs stacked thereon one by one to the device C as shown by concerned arrows and to be replaced with the other when one pallet is made empty, which is returned to the extruder or the warehouse for loading a new stack of plastic webs.

Figure 6:
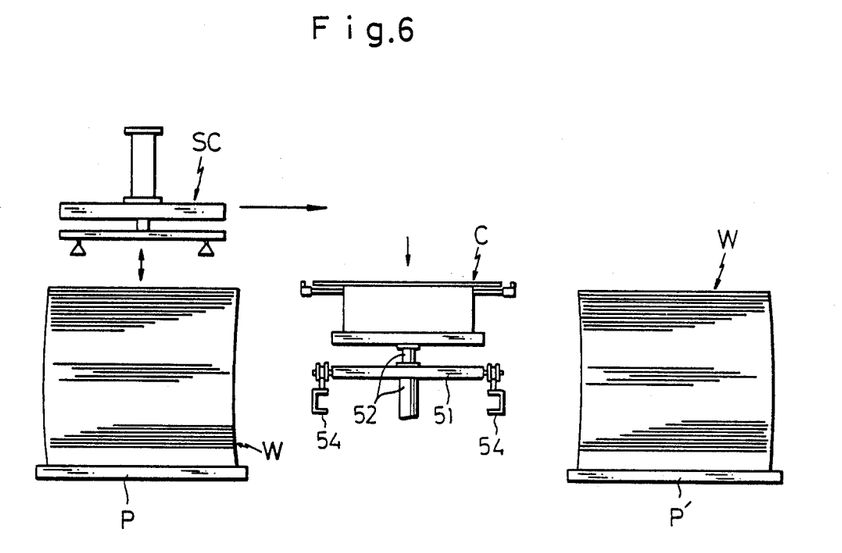
FIG. 6 is a diagrammatic front elevation of the device of the invention, a pair of pallets respectively loaded with a stack of plastic webs and a sucking disk carrier for feeding the plastic web from said pallet to said centering device.

In FIG. 6, a stack of the plastic webs W is shown as collapsed a little to be uneven during the delivery on the pallet P (P'). A suction carrier SC comprises a plurality of sucking disks and a pneumatic piston-cylinder device for applying negative pressure to the sucking disks for taking up the webs W from the pallet P or P' and dropping them one by one on the table of the device C.

Figure 7:
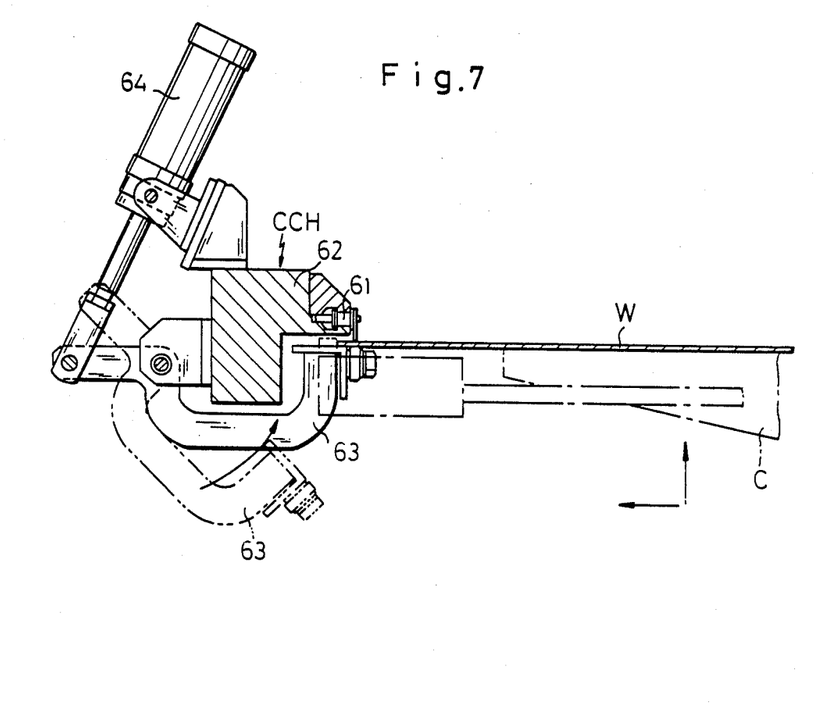
FIG. 7 is a front elevation of a cramp of the forming machine partly in section and a part of the device according to the invention for showing how the plastic web is fed from the latter to the former.

In FIG. 7, the centering device C of the invention on which the plastic web W has been centered on the table thereof is moved toward the pair of cramp chains CCH along the rails 54 and upward according to the piston-cylinder device 52 for feeding the plastic web W to be gripped at the opposite side edges thereof by the cramp chains CCH, each one of which comprises a plurality of chain links 61 to which a cramp body portion 62 is fixed. The cramp body 62 has an angularly movable cramp member 63 pivotally mounted thereon and a cylinder-piston device 64 for angularly moving said cramp member 63 between the two positions shown in solid lines and phantom lines. When the table supporting the centered web W of the centering device C is transversely and upwardly moved so that the concerned side of the web W is brought at the cramp body 62 with the cramp member 63 in the waiting position shown by phantom lines, the piston-cylinder device 64 is actuated to bring the cramp member 63 into the cramp position shown in the solid lines. Only one cramp chain is shown in FIG. 7, but the other similarly grip the web W at the opposite side edge.

The device C of the invention is then returned to the initial position for receiving the new plastic web from the pallet P (P').

What is claimed is;

1. A device for centering a plastic web of which length and width are varied depending on the size of an article to be formed, comprising a machine frame, a bed fixed thereto and consisting of a central frame and at least two longitudinal as well as at least two transverse arms respectively extending in opposite directions from said central frame so as to support the webs of various sizes thereon, at least two longitudinal as well as at least transverse guide rails respectively extending in opposite directions from and beneath said central frame, at least two pairs of centering members oppositely arranged, each having a pin vertically planted thereon so as to abut the web respectively on the concerned side edge and slidingly move along the respective longitudinal and transverse guide rails, first and second means for driving said pairs of opposite centering members to slindingly move toward and apart each other at the same rate.

2. The centering device as set forth in claim 1, in which each of said first and second driving means comprises a driving pulley and, a plurality of driven pulleys respectively mounted on said machine frame for rotation as well as a pair of endless belts respectively fixing said opposite centering members thereto and extended over said driving and driven pulleys so that when said driving pulley is rotated in either direction said belts run in opposite directions with each other so as to oppositely move said centering members toward and apart with each other.

3. The centering device as set forth in claim 2, in which a sprocket wheel is used instead of said pulley and a sprocket chain is used instead of said belt.

4. The centering device as set forth in claim 1, which further comprises a carriage supporting said machine frame as a whole via means for raising and lowering the machine frame thereon, said carriage having means for transversely moving the centering device as a whole so as to feed the centered plastic web to a pair of cramp chains to be gripped thereby at the opposite side edges.

* * * * *